United States Patent [19]
Olson

[11] Patent Number: 5,353,416
[45] Date of Patent: Oct. 4, 1994

[54] CPU LOCK LOGIC FOR CORRECTED OPERATION WITH A POSTED WRITE ARRAY

[75] Inventor: Anthony M. Olson, Stevensville, Mich.

[73] Assignee: Zenith Data Systems Corporation, Buffalo Grove, Ill.

[21] Appl. No.: 999,189

[22] Filed: Dec. 30, 1992

Related U.S. Application Data

[63] Continuation of Ser. No. 426,902, Oct. 25, 1989, abandoned.

[51] Int. Cl.⁵ .................... G06F 13/00; G06F 13/36
[52] U.S. Cl. ........................ 395/325; 395/725; 395/200; 364/DIG. 1; 364/238.6; 364/242.91; 364/246.8
[58] Field of Search .................. 395/425, 325, 725

[56] References Cited

U.S. PATENT DOCUMENTS

| 3,528,061 | 9/1970 | Zurcher, Jr. | 364/200 |
| 4,099,243 | 7/1978 | Palumbo | 364/200 |
| 4,214,304 | 7/1980 | Shimizu et al. | 364/200 |
| 4,313,161 | 1/1982 | Hardin et al. | 364/200 |
| 4,400,772 | 8/1983 | Broyles et al. | 364/200 |
| 4,488,217 | 12/1984 | Binder et al. | 364/200 |
| 4,594,657 | 6/1986 | Byrns | 364/200 |
| 4,621,318 | 11/1986 | Maeda | 364/200 |
| 4,864,496 | 9/1989 | Triolo et al. | 364/200 |
| 4,949,239 | 8/1990 | Gillett, Jr. et al. | 364/200 |
| 4,984,153 | 1/1991 | Kregness et al. | 364/200 |
| 5,163,143 | 11/1992 | Culley et al. | 395/425 |

Primary Examiner—Gareth D. Shaw
Assistant Examiner—Kakali Chaki
Attorney, Agent, or Firm—Charles W. MacKinnon; James A. Sprowl; Scott B. Dunbar

[57] ABSTRACT

A shared bus arbitration system is disclosed which provides logic allowing multiple processors to co-exist on a common bus. In the present invention, the host processor is isolated from the bus by a posted write array or write buffer. The arbitration system accepts bus lock and cycle signals when the processor writes a locked instruction to the posted write array and provides a bus lock signal to the bus when the locked instructions are written to the bus.

7 Claims, 3 Drawing Sheets

CPU LOCK LOGIC FOR CORRECTED OPERATION WITH A POSTED WRITE ARRAY

This application is a continuation of U.S. Ser. No. 07/426,902, filed Oct. 25, 1989, now abandoned.

BACKGROUND OF THE INVENTION

This invention relates to bus arbitration, lock logic and more particularly to bus arbitration and lock logic for accessing of memory shared between multiple processors.

With the advent of desk top and personal computers, computer technology has spread to millions of users. The technology in these computers is typically limited in large part by the architecture of the host-processor used in the computer. Thus, personal computers utilized embedded microprocessors such as the ZilogZ80, Z80, Intel 8080, 8088, 8086, 80286, 80386, 80486, Motorola, 6800, 68000, 68010, 68020, 68030, 68040, and others. These were initially very limited both in processing speed, band-width, and memory space capabilities. These systems typically provided expansion or extension bus systems, to allow for the addition of additional peripheral circuit cards to the system, such as adding more memory, disk controllers, graphic interfaces, etc.

As the demand increased for faster and more powerful processing, add-on processor boards were created, where control was temporarily passed from the original embedded host processor to the add-on processor, but where only one processor was actually operating as the Monitoring and Control processor at a time. Thus, control is transferred between one or the other of these co-processors.

Current state of the art desk top and personal computers now offer high-speed 32 bit microprocessors, and custom processor chip sets. These processors provide many new architectures and techniques to maximize the performance of the systems. This includes the Intel 80386 microprocessor, the Motorola 68030, and various newly announced processors such as the Intel 80486, the Intergraph Clipper computer chip set originally pioneered by Fairchild Semiconductor, as well as many others. While these desk top computers and personal computers are primarily intended as a single processor system, capabilities can be provided for multiple processor operation through the use of a second processor. However, in previous systems, only one of these two processors can actually be accessing memory at any one time instance. A given bank of memory can only be accessed by one processor at a time. This greatly restricts parallel processing capabilities, because of the asynchronous nature of bus demands by a plurality of unrelated processors, and because of contention and crash conditions which are created in back-to-back locked memory cycles.

The many problems of a multiprocessor system are further complicated by the problem of how to correctly arbitrate between multiple processors which need to access a shared memory space. One solution attempted in the past has been to use the demand or lock cycle functions of the embedded host-processor, where such features are present, such as in the Intel 80386. The 80386 has both bus arbitration logic and lock (or demand) cycle status output information provided by its internal logic. Due to the pipelined nature of the 80386 host processor, the processor has knowledge ahead of time as to which future cycles will be locked and which will not be. Lock cycles protect data integrity by allowing two-step "test and set" operations, and other back-to-back locked memory cycles of the host processor, to be uninterrupted during the actual writes to memory.

In a single processor environment, this makes it possible for the on-chip bus arbitration logic to decide when to give the bus access away from the host-processor itself.

In the multiprocessor application, a posted write array allows the faster processor to post its writes to a slower bus, where the processor is then free to start another cycle even while the bus is independently completing the posted writes. Thus, the posted write queue provides for asynchronous access to the shared memory array via a common bus system, while allowing each processor in the multiprocessor system to continue to operate synchronously within its own subsystem.

However, the processor direct control of the bus arbitration solution cannot be utilized when a posted write array is present in the system to buffer writes between the processor and the bus. This is the case because the processor must run asynchronously relative to the bus arbitration system, and therefore the processor's internal bus arbitration circuitry will be out of phase with what is actually occurring on the external bus.

The 80386 host processor's internal bus arbitration unit selectively gives control of the bus away at what the processor considers as the end of the cycle. Without the presence of a posted write array, the end of the processor cycle is the same as the end of bus cycle, and the processor's internal bus arbitration logic is in phase with the bus, and it thus gives away the bus at the proper time.

However, when a posted write array is installed in the system, the end of the processor cycle is no longer guaranteed to match the actual end of the bus cycle on the bus. Thus, the processor's internal bus arbitration unit can no longer be singularly utilized, since it can give the bus away at the end of the processor's cycle which could be in the middle of the actual bus cycle. If the bus were to be given away in the middle of the actual bus cycle, there would be contention on the bus and the system would crash.

The Posted Write Array allows asynchronous operation by isolating and buffering the processor from the memory write, and takes over the intelligent management of writes to the memory. The processor is thus able to post its writes to memory at very high speed to the posted write array queue, which thereafter takes care of writing to the actual memory independent of and asynchronous to the processor which posted the write.

In accordance with the present invention, a bus arbitration system is provided which insures the correct accessing of memory that is shared between multiple processors, particularly in computer systems utilizing a posted write array to queue writes to the shared memory, and a processor that is capable of commanding that its right to access the bus cannot be given away through the use of a lock signal or equivalent status output. The main host processor can thus continue to run, out of local cache memory, for example, even while the second processor has access to the bus and is running.

The use of a posted write array, and its multiple-processor capabilities, requires the system to provide an external bus arbitration subsystem, separate from the bus arbitration unit inside the host-processor (such as an 80386). The design of the external bus arbitration unit itself can be embodied in any of a number of ways. However, to properly function, the external bus arbitration subsystem must properly interface with and utilize the lock status output from the processor. This lock output must be correctly processed and appropriately interfaced to the external bus arbitration unit so that correct arbitration of the bus system can occur.

The proper handling of the processor lock status output is required prior to processing by the external bus arbitration unit. In many host-processors, such as the 80386, their external LOCK status output is placed into a floating or inactive state during idle cycles, even during idle cycles which occur between locked cycles of the processor. Furthermore, with the use of a posted write array, the bus main memory can have back-to-back LOCKed cycles on the bus, while not actually having back-to-back locked cycles coming out of the processor.

The existence of these two conditions is important. The benefit of utilization of the LOCK status output is to prevent the bus from being given away between consecutive processor cycles which are locked. Proper handling of the LOCK status output is provided in accordance with the present invention, so that even as the LOCK status output from the processor goes invalid because of the presence of an idle cycle between two consecutive locked processor cycles, the bus will not be given away creating a contention problem. In a preferred embodiment, special handling of the lock status output is provided so that even if consecutive lock cycles do occur on the bus, the bus can be given away if the consecutive locked bus cycles did not originally occur as locked consecutive cycles from the processor.

In accordance with the present invention, the proper handling and preprocessing of the LOCK status output prior to coupling to the external bus arbitration unit is provided for, to avoid the above-mentioned problems.

To properly handle the processor lock signal going invalid during idle cycles, the system of the present invention provides a memory or logic to retain knowledge of the lock status of the current cycle and of the previous cycle whether or not an idle cycle occurred between them, and decision logic to determine whether to give the bus away, or not. If the cycle before the idle cycle was a non-locked cycle from the processor, then, if a bus request is pending, the bus can be given away. However, if the cycle immediately preceding the idle cycle was a locked cycle from the processor, then the bus cannot be given away until the idle cycle is over and the next cycle begins. The bus cannot be given away in this instance until the next cycle begins, because it is only then that a LOCKED status of the cycle which is about to begin will actually be known. If this next (new) cycle is locked, then there will have been two back-to-back locked cycles from the processor, and the bus cannot yet be given away. However, if this new cycle is non-locked from the processor, then the bus can be given away before this new cycle starts on the bus. The decision logic properly utilizes the stored data from the memory to provide for restricted and controlled access to a shared memory so as to prevent conflict or loss of data integrity.

BRIEF DESCRIPTION OF THE DRAWINGS

Other features and advantages of the invention will become apparent from the following detailed description and the accompanying drawings, wherein.

DETAILED DESCRIPTION OF THE DRAWINGS

Figure 1:
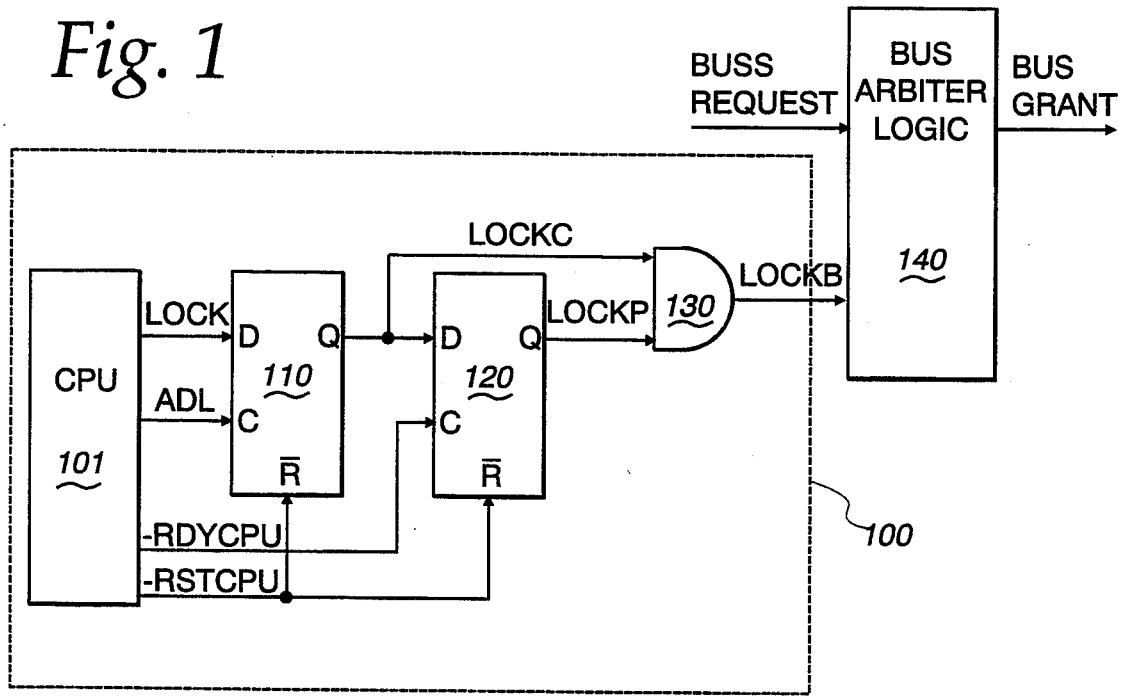
FIG. 1 is an electrical logic schematic drawing of a LOCK Arbitration Subsystem in accordance with the present invention.
Figure 2:
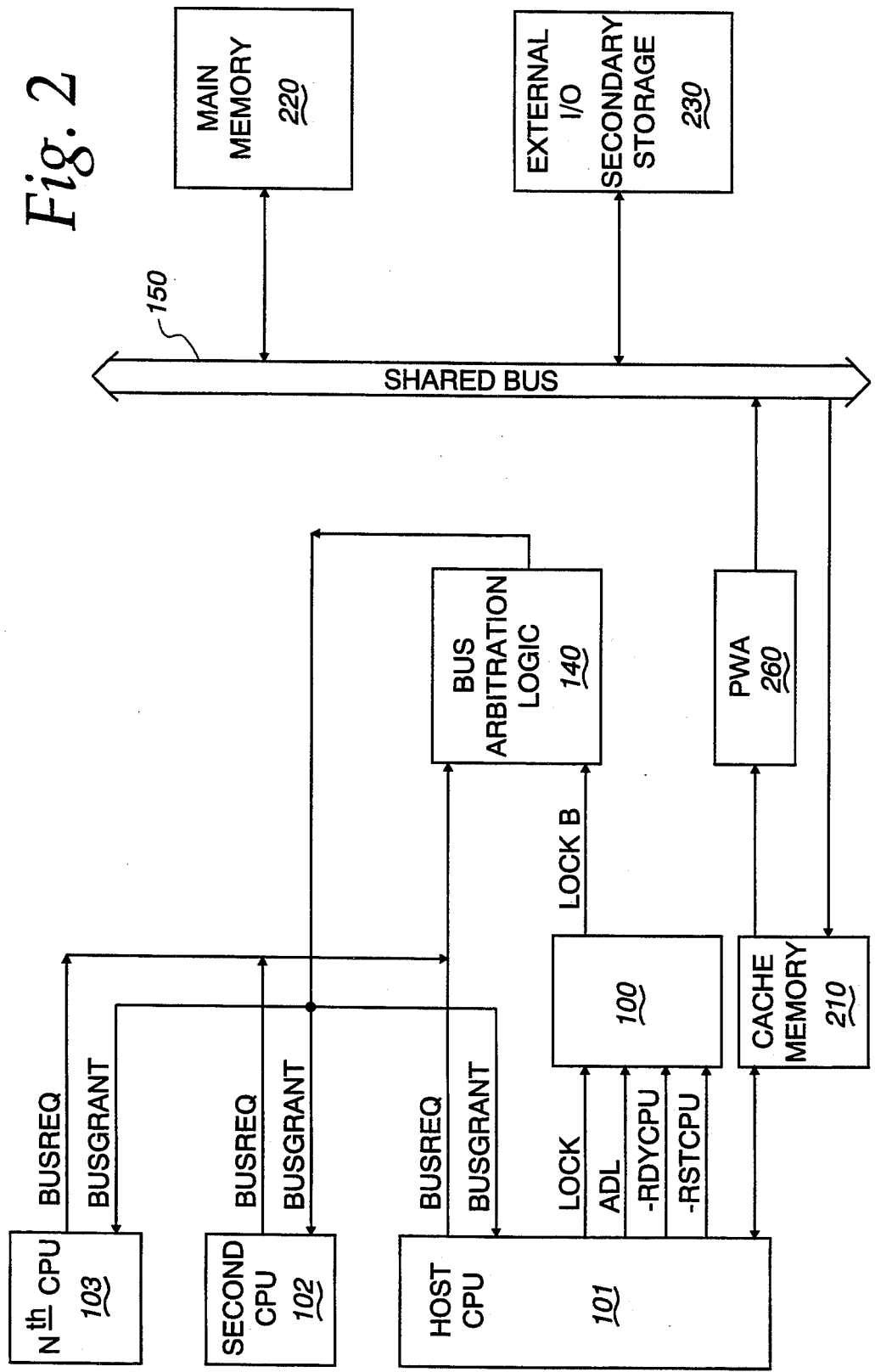
FIG. 2 is an electrical logic schematic diagram of LOCK Subsystem of FIG. 1 in a multiple processor, shared bus architecture in accordance with the present invention.

FIG. 1 illustrates a circuit embodiment which can be utilized as a solution to the above problems, which embodies one aspect of the present invention. FIG. 2, illustrates the circuit of FIG. 1 in a shared bus architecture in conjunction with a host and a secondary processor, each having its own memory cycle timing demands, creating contention at times, which contention is resolved by utilization of the circuitry of FIG. 1.

As illustrated in FIG. 2, the HOST CPU 101 is coupled to a high speed CACHE memory, 210, which is therefrom coupled to a Posted Write Array 260, which are both coupled to the shared bus 150. Also coupled to the shared bus 250 Main memory 220 and secondary storage 230 both relatively slow compared to the CPU's 101, 102, 103, and CACHE 210, and PWA 260.

In a cached microprocessor environment, a data write will first pass through the cache system. If the desired location is housed in cache, then cache will be immediately updated.

Depending on the write policy of the cache, the data will either be immediately passed to main memory, or delayed until write-back logic in the cache passes the data to main memory. If the data was not housed in cache, then it is passed on to main memory. In most systems, the processor is made to wait until the write process is completed.

The performance of a system with write-through policy cache can be increased by allowing the processor writes to system memory to be queued, or posted, for eventual transmission to main memory.

Figure 4:
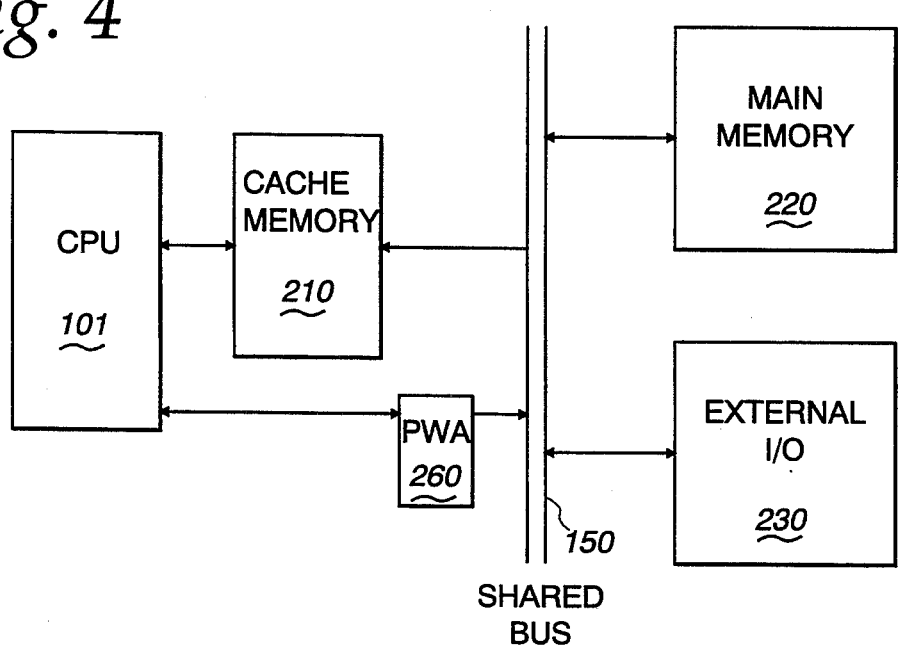
FIG. 4 is an electronic block diagram illustrating the PWA of FIG. 3 in a system architecture including Cache Memory, HOST CPU, and Main Memory.
Figure 3:
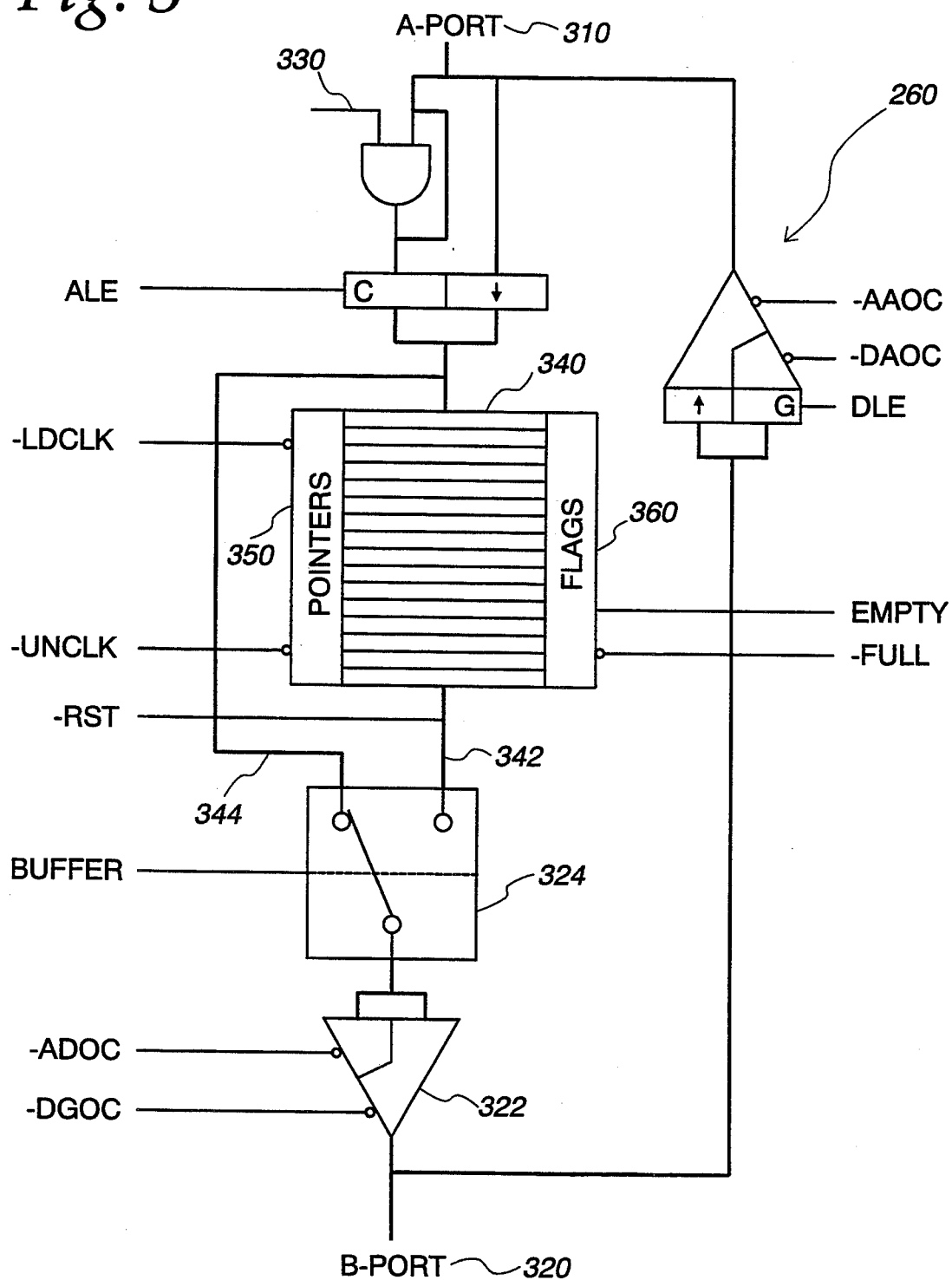
FIG. 3 is an electrical logic schematic block diagram illustrating a Posted Write Array (PWA)

FIG. 3 shows the basic architecture of the Posted Write Array (PWA). FIG. 4 shows how the PWA 260 fits into the system 201. Referring to system 201 of FIG. 4, the host processor CPU 101 is coupled to Cache memory 210, and to Posted Write Array (PWA) 260. The Cache Memory 210 and PWA 260 are each separately coupled to a Shared System Bus 150 to which is coupled Main Memory 220 and External I/O 230 (such as Disk Drives, tape drives, printers, etc).

Referring again to FIG. 3, to the PWA 260, the A-port 310 is shown connected directly to the CPU address/control outputs, byte-enable control signals, and to the data busses. The B-port 320 then connects corresponding busses to a system/memory bus controller. In this manner, the PWA basically functions as a buffer device between the cached processor and the rest of the system.

The bidirectional ports have specialized inputs for each bus grouping. The byte-enable bus group of A-port 310 has two inputs which may be gated by an external signal 330. This mechanism is typically used to force a 32-bit word load on a cache read miss. Both the address/control and byte-enable groups have flow-through input latches, enabled with the Address Latch Enable signal output, ALE, from the processor which, holds the input values if they change before a PWA latch cycle has finished.

The data bus group on the B-port 320 also has flow-through input latches which are enabled responsive to a Data Latch Enable (DLE) signal output from the processor. These latches are used to store data during a processor read from the system if the data will not be valid by the time that the processor is ready.

The FIFO data stack 340 as illustrated is 33-bits wide and 16-levels deep. It is built from flow-through (transparent) latches which are addressed by cyclic read and write pointers, Pointers 350. The address pointers are clocked by synchronous UNload-CLocK (UNCLK) and LoaD-CLocK (LDCLK) signals. Overflow and underflow prevention is provided by EMPTY and FULL hardware inputs to flags logic 360. A system ReSeT (RST) signal places both of the address pointers at the "top" of the stack, and set the hardware flags to an empty condition.

When the non-full PWA is presented with a LoaD-CLocK signal, it latches the selectively-latchable CPU address/control busses and gated byte-enables, along with the CPU data bus, and couples all of said signal information into the FIFO data latch at the locations pointed to by the write pointer. If the PWA was previously empty, then the EMPTY flag would be initially turned-off. If the last load cycle made the FIFO stack full, then the FULL flag would be turned-on. If the PWA was already full, then the FIFO latch cycle would have been ignored.

When the non-empty PWA is presented with the UNload-CLocK, the read address pointer selects the next data latch to output. If the PWA was previously full, then the FULL flag would be turned-off. If the last unload cycle made the FIFO stack empty, then the EMPTY flag would be turned-on. If the PWA was already empty, then the unload cycle would have been ignored.

The B-port 320 output buffer 322 can be multiplexed via Multiplexer 324 between the FIFO data stack output 342 and the A-port latched and direct inputs 344. This mechanism allows the FIFO flow-through time to be greatly improved since data does not have to flow-through the FIFO data stack in order to be valid at the outputs.

Both the A-port and B-port output buffers have separate controls for the address/control and byte-enables busses, and the data bus. This allows a local/system read command to be present at the B-port while the processor is presented the data at the A-port. Although not typically used, a local/system command may also be piped from the B-port to the A-port.

A non-full PWA will store an entire write command (address, control, and data) issued by the cached processor without adding waitstates. When the PWA is full, the processor has to wait until the first command that was posted has finished. To avoid processor wait conditions, the FIFO depth is determined by the number of writes which occur before the FIFO has a chance to be serviced by the bus controller.

In a typical system, the most frequent system memory writes will occur during block operations, stack operations, and memory writes within recursive procedures. Block instructions, such as programmed disk I/O, are usually infrequent but rather lengthy.

A cached processor system read (I/O, memory, or hardware initiated interrupt) must wait until the PWA's FIFO is empty. This is necessary since the PWA's FIFO contents may effect the read data. In addition, the bus cannot be granted to a temporary master if the PWA's FIFO is currently in the middle of the locked cycle. This will usually occur during a semaphore Read-Modify-Write (RMW) sequence. When the Read cycle, of a locked RMW, location is a cache hit, the cycle must be forced to the main bus through the PWA FIFO to ensure semaphore integrity.

An intelligent write queue can be used to allow the queuing of write commands through a RAM-based FIFO to main memory, without penalty from interleaved read commands from global memory and/or I/O.

The performance of a cached processor with write-through policy can be improved with the addition of a posted write array queue between the cached processor and the main memory. This queue stores a finite number of write commands which are used by the queue server to reconstruct the write cycle for bus broadcast. In this manner, a finite number of writes can be received from the cache processor without added wait-states.

If a read cycle from outside of the cached processor domain occurs, then a non-intelligent queue must be emptied to eliminate the possibility that a write has been queued which could effect the value to be read. The intelligent posted write array queue enables most of the reads that are due to cache misses or I/O cycles to supersede the write process from the queue.

If an I/O cycle occurs, the address is checked with fixed and/or programmable ranges to determine if the I/O cycle can supersede the queued memory writes. For example, programmed I/O to a non-intelligent fixed drive controller can bypass queued writes. However, in the case of I/O cycles to video, the queue must be completely flushed.

FIG. 2 illustrates a multiple CPU embodiment of the system of FIG. 4 with the addition of the LOCK Logic 100 of (FIG. 1) and Bus Arbitration Logic 140 coupled to the multiple CPU's for selectively granting access to System Bus 150 so as to prevent bus contention conflicts from overlapping Bus requests from multiple CPU's. The LOCK Logic 100 provides for protection of the HOST CPU's "critical" back-to-back locked cycles which must be preserved as such. The Bus Arbitration Logic 140, responsive to supervisory control of the LOCK Logic 100 (illustrated as the LockB enable signal), selectively grants access (BUS GRANT) to one of the requesting CPU's.

Referring again to FIG. 1, at the start of the CPU 101 (illustrated as an Intel 80386) processor cycle, the HOST CPU 101 outputs a LOCK signal, and an ADL signal (the Address Data Latch signal output) which is coupled to the clock input so as to clock flip flop 110. The processor LOCK status signal output from CPU 101 is the CPU's lock status for the current cycle, and is coupled to the D input of flip-flop 110. The LOCKC output of D flip-flop 110 provides the current cycle status output of the lock interface subsystem 100 of the present invention, and is coupled to the input of a second D flip-flop 120 and is also coupled to one input of AND gate 130. Flip-flop 120 Q output is LOCKP, which is active when the previous cycle was also LOCKED. If the current cycle is locked, but the previous cycle was not locked, then the LOCKC signal will be active and the LOCKP output, the previous lock cycle status output of the subsystem, will be inactive, and therefore AND gate 130 output LOCKB will be inactive.

Prior to the start of a cycle, (e.g. cycle 1), the LOCKB output being inactive permits the bus to be given away (since the current cycle has not yet started on the bus). However, once cycle 1 has started on the bus 150, the system of FIG. 1 selectively controls access to the bus such that the bus cannot be given away until a valid bus cycle on bus 150 begins with an unlocked status. Assume cycle 1 is the first cycle of a back-to-back locked cycle pair. When cycle 1 ends, a Not Ready CPU signal output, indicated as -RDYCPU, is coupled from the host processor 101, and indicates that the processor cycle is complete. This -RDYCPU signal, additionally clocks the LOCKC signal from cycle 1 into D flip flop 120. This in turn causes the Q output LOCKP signal to go active since the previous cycle's LOCKC was active which would in turn result in the LOCKB output signal going active.

The LOCKB signal output is the output of the interface subsystem 100 which is provided as an input to the external Bus Arbitration Logic unit 140, to which a BUSREQuest signal input is also coupled. The BUSREQ signal can be common or'ed or otherwise commoned among multiple bus requestors, illustrated in FIG. 2 as HOST CPU 101, Second CPU 102 and Nth CPU 103.

If the next cycle (e.g. the second cycle) is the back locked cycle corresponding to cycle 1, the LOCK signal from the HOST processor 101 is clocked into flip flop 110 by the ADL signal, the LockC output of flip flop 110, remains active, and the LOCKB output remains active.

Even though the BUS REQuest signal is active during cycle 1, the state of the LOCKB signal prevents the bus from being given away, even after cycle 1 is over and no new cycle has started. When the next cycle begins (e.g. cycle 3), the ADL signal clocks in the current processor LOCK status output into D flip flop 110. If cycle 3 is locked, then the LOCKC signal output will not change states, and therefore the LOCKB signal will not change states. Thus, the bus will not be given away.

If however, at the start of cycle 3, cycle 3 is non locked, then the LOCKC signal will go inactive, which in turn results in the LOCKB signal going inactive, such that the bus can be given away before cycle 3 starts on the bus.

The Bus Arbitration Logic 140 requires an inactive LOCKB to permit activation of its BUSGRANT output, responsive also to the BUSREQ inputs.

FIG. 2 illustrates a HOST CPU 101, a SECOND CPU 102, and an optional Nth CPU 103, which multitude of CPU's can be paralleled as wide as desired. Each CPU 101, 102, and 103, requests access to the shared bus 150 for communication of data therewith via a BUS REQuest/BUS GRANT protocol. The HOST CPU 101 provides "LOCK", "ADL", -RDYCPU, and -RSTCPU signal inputs to the LOCK Arbitration Subsystem 100 of FIG. 1, which provides the LOCKB signal output responsive thereto. As described above, the LOCKB output is coupled as an input to the BUS ARBITRATION LOGIC 140, which can be simple (e.g. combinational logic (AND/NAND/OR)) or more complicated computationally based.

The lock interface subsystem 100 also provides a solution to the problems resulting where the posted write array 260 and cache memory 210 have back-to-back locked cycles on the shared bus 250, while not actually having back-to-back locked cycles out of the processor 101. This is handled by monitoring every cycle out of the processor in sequential order, before those cycles occur on the local shared bus. The result of this monitoring is loaded into the posted write array along with the address, control, and data information for the posted write.

If the bus is requested, it should only be given away between cycles on the bus which correspond to cycles which occurred out of the processor as non back-to-back locked cycles. Thus, even when the cycle that just completed itself on the shared bus was locked, cycle A, and the next cycle to occur on the shared bus would be locked, cycle C, the bus can be given away before cycle C is allowed to begin on the shared bus when, at the processor output, a non locked cycle, Cycle B, had originally occurred between cycle A and cycle C.

Referring to FIG. 1, when the first cycle starts, the ADL signal output from the processor 101 clocks the processor's LOCK status into D flip flop 110, and the LOCKC output goes active. Next, the first cycle (e.g. Cycle A) then ends at the processor, and the -RDYCPU output clocks the LOCKC status output into D flip flop 120. This results in causing each of the LOCKP and LOCKB outputs to go active, but only momentarily where the next cycle (e.g. Cycle B) is an unlocked cycle which thereafter starts and the respective ADL signal output clocks the processor's unlocked LOCK status output into D flip flop 110.

This causes the LOCKC signal output to go inactive, which causes the LOCKB signal output to go inactive. If at this point, the bus request signal BUSREQ output level goes active after cycle B begins on the processor, but before cycle A ends on the bus, then, even though a subsequent cycle C comes out of the processor 101 and to the bus 150 as locked, the bus will be given away after cycle A ends on the shared bus. This is the desired result, and is the direct affect that cycle B had on the LOCK logic subsystem 100. Thus, the LOCK logic 100 operates to allow free access to the shared bus 250, except as absolutely needed to protect back-to-back critical locked cycles from the Host processor.

While there have been described herein various aspects and details of the illustrated embodiments associated with the present invention, it will be understood and appreciated by those skilled in the art, that the teachings of the present invention extends to various other aspects and embodiments. Therefore, the scope of the claims appended hereto shall be read in their broadest meaning consistent with the disclosure and drawings hereof.

What is claimed is:

1. A shared bus arbitration system comprising:
a processor having a self-contained bus lock arbitration capability providing a processor bus lock output, a cycle start output, and a cycle end output, said self-contained bus lock arbitration capability being operative to provide a first processor bus lock signal on said processor bus lock output, a first cycle start signal on said cycle start output, and a first cycle end signal on said cycle end output during a first locked processor cycle and a second processor bus lock signal on said processor bus lock output, a second cycle start signal on said cycle start output and a second cycle end signal on said cycle end output during a second locked processor cycle;

a write buffer, coupled to a shared bus and to said processor, for asynchronously buffering data writes from said processor to said shared bus; and logic means coupled to said processor bus lock output, said cycle start output, and said cycle end output and responsive to said first processor bus lock signal, said second processor bus lock signal, said first cycle start signal, said second cycle start signal, said first cycle end signal, and said second cycle end signal for selectively providing a shared bus lock signal to said shared bus when data from two consecutive locked processor cycles is written to said shared bus from said write buffer that was written to said write buffer from said processor during consecutive locked processor cycles; and control means coupled to said shared bus lock signal for granting exclusive access to said shared bus by said write buffer in response to said shared bus lock signal.

2. The shared bus arbitration system as in claim 1 wherein:

an output gate of said processor bus lock output is at a high-impedance state when the processor bus lock output is in an unlocked state.

3. The shared bus arbitration system as in claim 1, further comprising;

a cache memory coupled to said processor and to said write buffer, for selectively storing and outputting data; and wherein said write buffer is a Posted Write Array, coupled to said shared bus, to said cache memory, and to said processor, for asynchronously buffering and managing transfers of data from said processor and said cache memory, to said shared bus.

4. The shared bus arbitration system as in claim 1, further comprising:

one or more additional processors coupled to and responsive to said control means;

a cache memory coupled to said processor and to write buffer, for selectively storing and outputting data; and wherein said write buffer is a Posted Write Array, coupled to said shared bus, to said cache memory, and to said processor, for asynchronously buffering and managing transfers of data from said processor and said cache memory to said shared bus.

5. A shared bus arbitration system, for controlling access to a shared bus to which is coupled (i) a first processor having internal bus lock logic and providing a first processor bus lock output, a first processor cycle start output, a first processor cycle end output, a first processor bus grant input for granting control of the shared bus and having a first processor bus request output for requesting control of the shared bus, said first processor being operative to provide a first processor bus lock signal on said first processor bus lock output, a first cycle start signal on said first processor cycle start output, and a first cycle end signal on said first processor cycle end output during a first processor cycle and a second processor bus lock signal on said first processor bus lock output, a second cycle start signal on said first processor cycle start output and a second cycle end signal on said first processor cycle end output during a second processor cycle and (ii) a second processor providing a second processor bus request output for requesting control of the shared bus coupled to said first processor bus request output, and having a second processor bus grant input for granting control of the shared bus coupled to said first processor bus grant input; said system comprising:

a write buffer, coupled to said shared bus and to said first processor, for asynchronously buffering data writes from said first processor to said shared bus;

logic means coupled to said processor bus lock output, said cycle start output, and said cycle end output and responsive to said first processor bus lock signal, said second processor bus lock signal, said first cycle start signal, said second cycle start signal, said first cycle end signal, and said second cycle end signal for selectively providing a shared bus lock output when data is written to said shared bus from said write buffer that was written to said write buffer from said processor when said processor bus lock output was active, said logic means further comprising means for selectively providing a second cycle lock output responsive to said first processor bus lock output and first processor cycle start output;

means for selectively providing a first cycle lock output responsive to a first processor bus lock output, and said second cycle end output;

means for selectively providing said shared bus lock output responsive to said second cycle lock output and said first cycle lock output; and control means for granting access to said shared bus for a selected one of said processors by asserting a shared bus grant input to said selected one of said processors responsive to said shared bus lock output.

6. The shared bus arbitration system as in claim 5 wherein:

an output gate of said processor bus lock output is at a high-impedance state when the processor bus lock output is in an unlocked state.

7. The shared bus arbitration system as in claim 5, further comprising:

a cache memory coupled to said first processor and to said write buffer, for selectively storing and outputting data;

wherein said write buffer is a Posted Write Array, coupled to said shared bus, to said cache memory, and to said processor, for asynchronously buffering and managing transfers of data from said processor and said cache to said shared bus.

* * * * *